United States Patent [19]
Ichikawa

[11] Patent Number: 5,973,830
[45] Date of Patent: Oct. 26, 1999

[54] BINOCULAR WITH INTERPUPILLARY ADJUSTMENT MECHANISM

[75] Inventor: Mitsuru Ichikawa, Saituma-ken, Japan

[73] Assignee: Asahi Kogaku Kogyo Kabushiki Kaisha, Tokyo, Japan

[21] Appl. No.: 09/014,978

[22] Filed: Jan. 28, 1998

[30] Foreign Application Priority Data

Jan. 29, 1997 [JP] Japan ..................... 9-029616

[51] Int. Cl.⁶ .................................................. G02B 23/00
[52] U.S. Cl. ........................................... 359/415; 359/412
[58] Field of Search .................................. 359/407, 408, 359/409, 411, 412, 414, 413, 415, 416, 417, 418, 480, 481

[56] References Cited

U.S. PATENT DOCUMENTS

| | | | |
|---|---|---|---|
| 1,338,241 | 4/1920 | Meling | 359/416 |
| 2,988,955 | 6/1961 | Sampei Goto et al. | 359/414 |
| 4,659,194 | 4/1987 | Swartz | 359/414 |
| 5,071,242 | 12/1991 | Yanagisawa | 359/416 |
| 5,583,692 | 12/1996 | Funatsu | 359/422 |

FOREIGN PATENT DOCUMENTS 61-31286  9/1986  Japan .

*Primary Examiner*—Cassandra Spyrou
*Assistant Examiner*—Mark A. Robinson
*Attorney, Agent, or Firm*—Greenblum & Bernstein, P.L.C.

[57] ABSTRACT

A binocular includes first and second rotatable bodies respectively accommodating two telescope systems, which are rotatable about two rotation axes for interpupillary adjustment. The binocular further includes a groove provided to the first rotatable body and a pin provided to the second rotatable body. The pin is in contact with the groove in such a manner that the contact member is slidable with respect to the groove. When one of the rotatable bodies is rotated, the other is also rotated due to the contact of the pin and said groove.

13 Claims, 10 Drawing Sheets

BINOCULAR WITH INTERPUPILLARY ADJUSTMENT MECHANISM

BACKGROUND OF THE INVENTION

The present invention relates to a binocular with an interpupillary adjustment mechanism.

FIGS. 1 and 2 are a perspective view and an exploded perspective view of a conventional binocular having an interpupillary adjustment mechanism. As shown in FIG. 1, in such conventional binocular 100, eyepiece optical axes of left and right eyepiece portions 103 and 104 are respectively off-centered with object optical axes XL and XR of frontmost lenses 101 and 102 of left and right object systems. The eyepiece portions 103 and 104 are swingable about the object optical axes XL and XR respectively, so as to vary the distance between left and right eyepiece portions 103 and 104.

As shown in FIG. 2, the binocular 100 includes left and right rotatable bodies 105 and 106 respectively accommodating left and right telescope systems. The left rotatable body 105 includes a front barrel 105a and a rear barrel 105c which are parallel but off-centered with each other and an intermediate barrel 105b provided between two barrels 105a and 105c. Similarly, the right rotatable body 106 including a front barrel 106a and a rear barrel 106c and an intermediate barrel 106b. The binocular 100 further includes a support arrangement (a front support 110 and a rear support 111) which supports the rotatable bodies 105 and 106 so that the rotatable bodies 105 and 106 can be rotated about the object optical axes XL and XR, thereby to swing the rear barrels 105c and 106c and to vary the distance between the eyepiece portions 103 and 104.

In order to synchronize the rotation of the left and right rotatable bodies 105 and 106, a pair of sector gears 107 and 108 are provided on facing curved walls of the intermediate barrels 105b and 106b. The sector gears 107 and 108 engage with each other. When an observer rotates one of the rotatable bodies 105 and 106, the other is also rotated due to the engagement of the sector gears 107 and 108. Thus, the interpupillary adjustment is symmetrical.

FIGS. 3A and 3B are rear views of the rotatable bodies, respectively showing the state the interpupillary distance is maximum and the state the interpupillary distance is minimum. As shown in FIGS. 3A and 3B, there is a space 120 between two facing curved walls of the intermediate barrels 105b and 106b. In order to minimize the binocular 100, it is preferable to utilize the space 120 for accommodating an operation knob (for example, a focus adjusting knob). However, since the sector gears 107 and 108 move into the space 120 as shown in FIG. 3B, it is difficult to utilize the space 120 for accommodating the operation knob.

SUMMARY OF THE INVENTION

It is therefore an object of the present invention to provide a compact binocular, without lowering of the performance of an interpupillary adjustment mechanism.

According to an aspect of the present invention, a binocular includes first and second rotatable bodies respectively accommodating the telescope systems, which are rotatable about two rotation axes for interpupillary adjustment. The binocular further includes a sliding surface provided to the first rotatable body and a contact member provided to the second rotatable body. The contact member is in contact with the sliding surface in such a manner that the contact member is slidable with respect to the sliding surface by a certain amount. When one of the rotatable bodies is rotated, the other is also rotated due to the contact of the contact member and the sliding surface.

With such an arrangement, since both rotatable bodies are synchronized due to the sliding contact of the contact member and the sliding surface, it is possible to arrange the contact member and the sliding surface at lower side with respect to the rotating axes of the rotatable bodies. Accordingly, it is possible to utilize a space above the rotating axes of the rotatable bodies, for accommodating an operation knob (for example, a focus adjusting knob). Thus, the binocular can be compact in size, without lowering of the performance of an interpupillary adjustment mechanism.

In a particular arrangement, the sliding surface includes inner surfaces of a groove formed on a protruding body provided to the first rotatable body. In this case, the contact member includes a pin which engages the groove.

It is preferred that the groove has a width in a direction of the rotation axes of the rotatable bodies and that the pin extends in the same direction. It provides a secure engagement of the pin and the groove.

Further, the groove is curved so that, where the pin contacts the groove, the inner surfaces (of the groove) are perpendicular to the rotating direction of the pin. With this, when an observer rotates one of the rotatable bodies, the pin effectively urges the groove (or the groove effectively urges the pin). It enables the observer to smoothly operate the interpupillary adjustment.

Further, it is possible that the groove has two ends, one end being opened and the other being closed. In this case, it is possible that the pin abuts a closed end of the groove when the interpupillary distance is minimum. Optionally, it is preferable to provide a stopper to which the protruding body abuts when the interpupillary distance is maximum.

DESCRIPTION OF THE PREFERRED EMBODIMENT

The present invention is described with reference to the preferred embodiment thereof.

Figure 1:
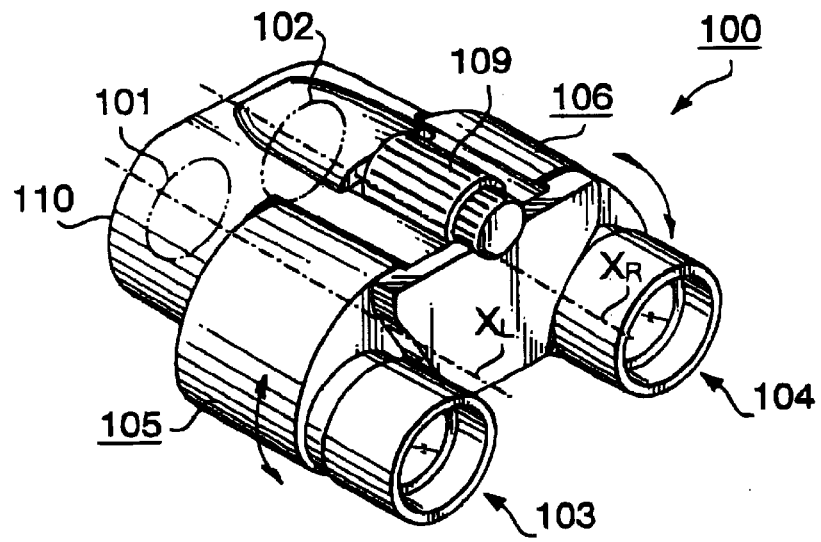
FIG. 1 is a perspective view illustrating a conventional binocular with an interpupillary adjustment mechanism.
Figure 2:
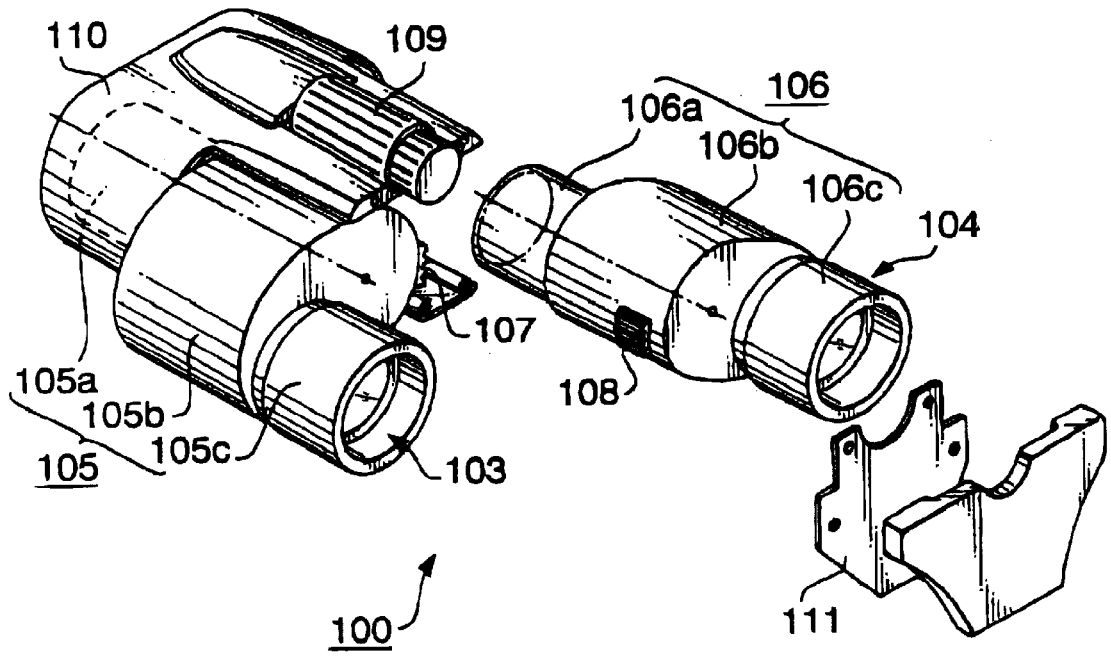
FIG. 2 is an exploded perspective view of the binocular of FIG. 1.
Figure 3A:
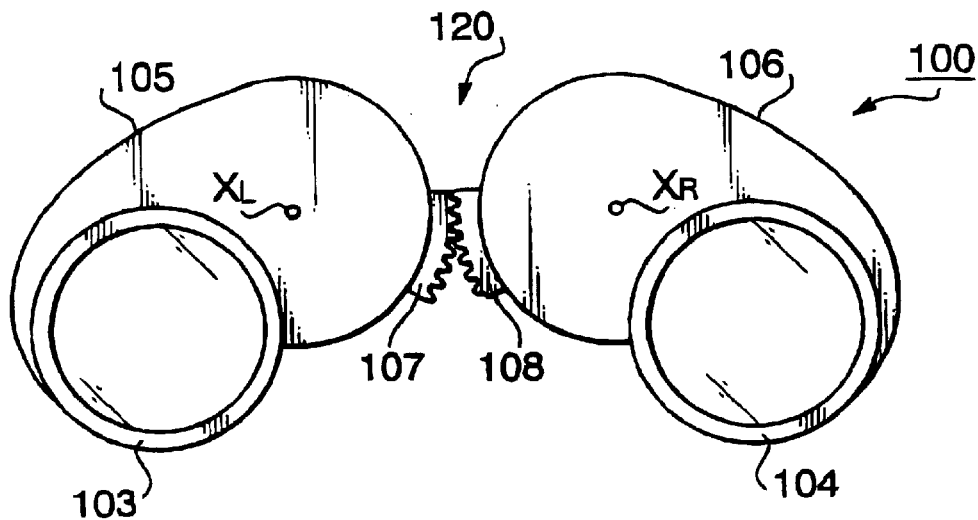
FIGS. 3A and 3B are a schematic view showing the operation of sector gears of the binocular of FIG. 1.
Figure 3B:
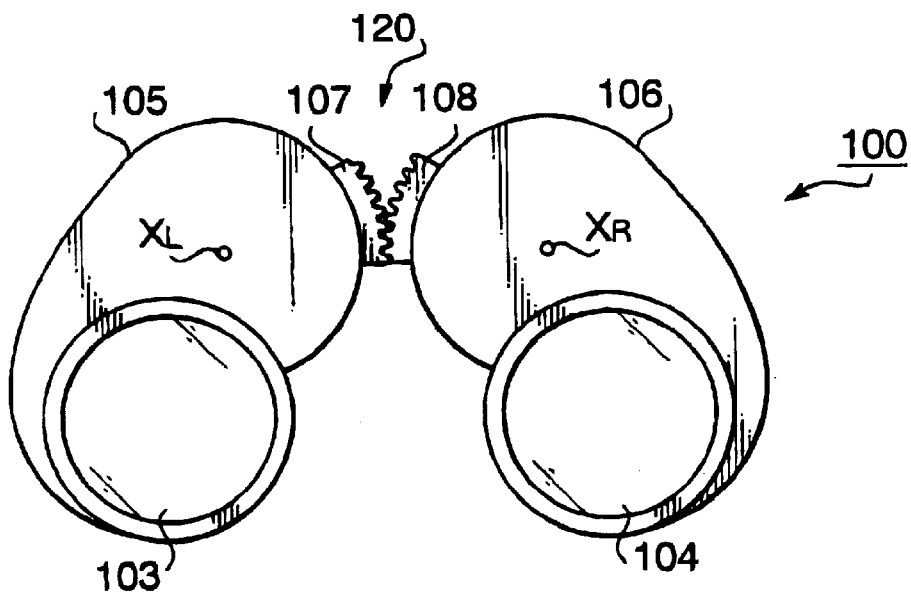
Figure 4:
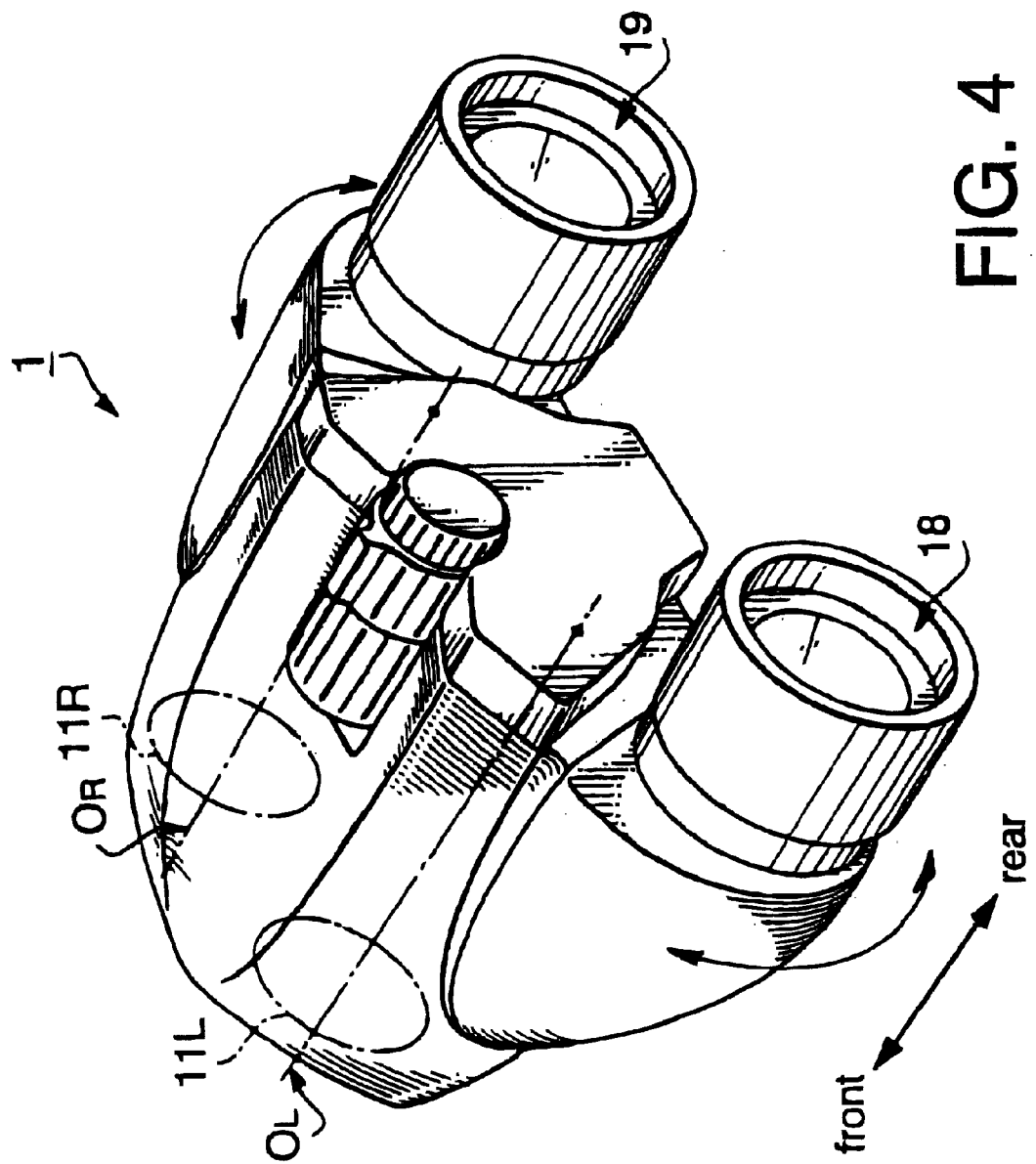
FIG. 4 is a perspective view of binocular according to an embodiment of the present invention.
Figure 5:
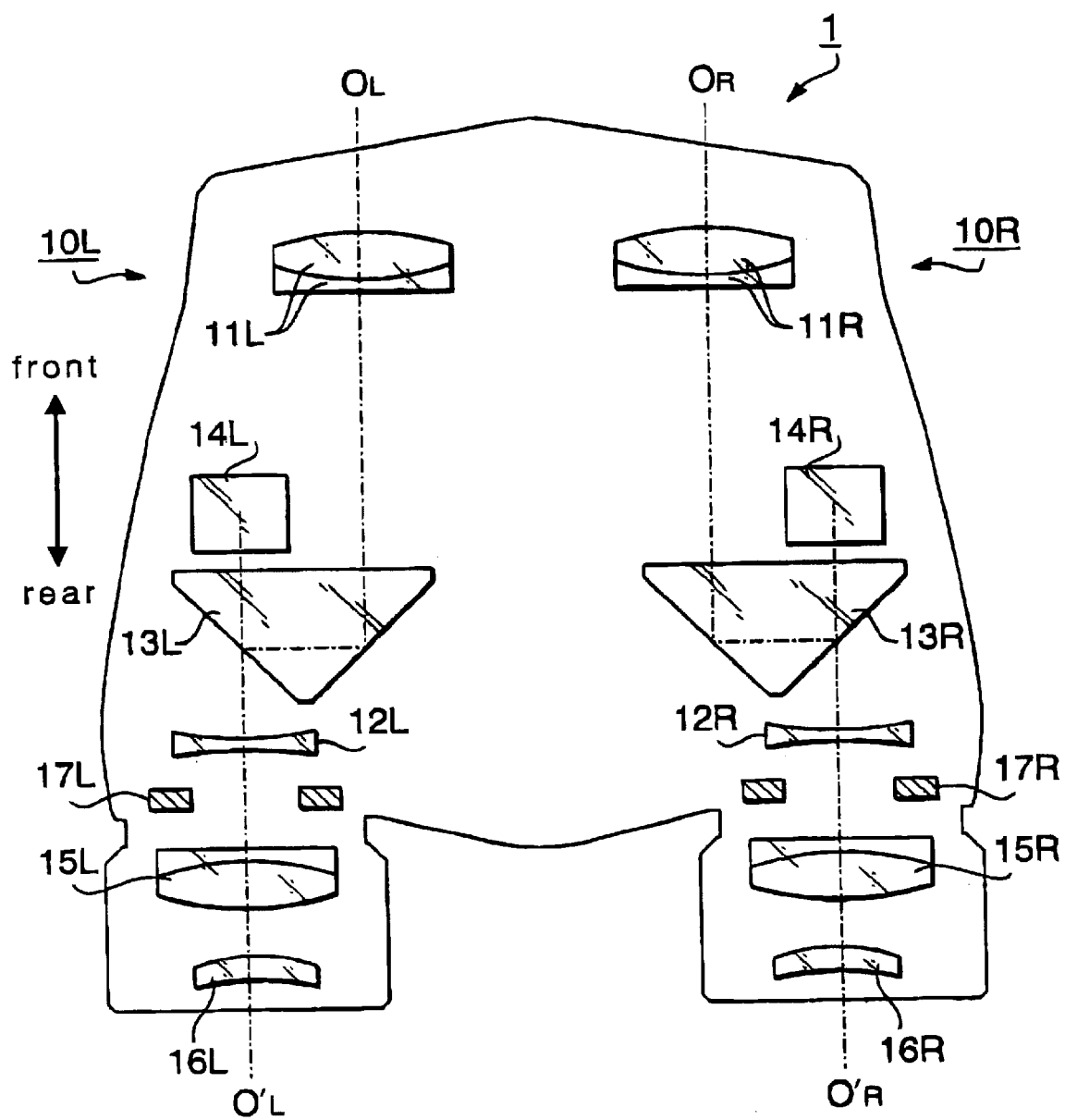
FIG. 5 is a schematic view showing an optical system of the binocular of FIG. 4.

FIG. 4 is a perspective view showing an external view of a binocular 1 according to the embodiment. FIG. 5 shows optical systems of the binocular 1. As shown in FIG. 5, the binocular 1 includes left and right telescope systems 10L and 10R. Since the telescope systems 10L and 10R are symmetrical with each other, the description will deal with the left telescope system 10L and the corresponding reference numbers for the right telescope system 10R will be shown in brackets.

The telescope system 10L (10R) includes first lens 11L (11R), porro prisms 13L and 14L (13R and 14R), second lens 12L (12R), third lens 15L (15R) and fourth lens 16L (16R). The first lens 11L (11R) and the second lens 12L (12R) constitute an objective system. The third lens 15L (15R) and the fourth lens 16L (16R) constitute an eyepiece system. The porro prisms 13L and 14L (13R and 14R) constitute an erecting system. A field stop 17L (17R) is disposed where an image is formed by the objective system. Eyepiece optical axes O'L and O'R of the left and right eyepiece systems are respectively parallel but off-centered with object optical axes OL and OR of the first lenses 11L and 11R. Hereinafter, an objective side of the binocular 1 is referred to as, 'front', while an eyepiece side of the binocular 1 is referred to as 'rear'.

Figure 6:
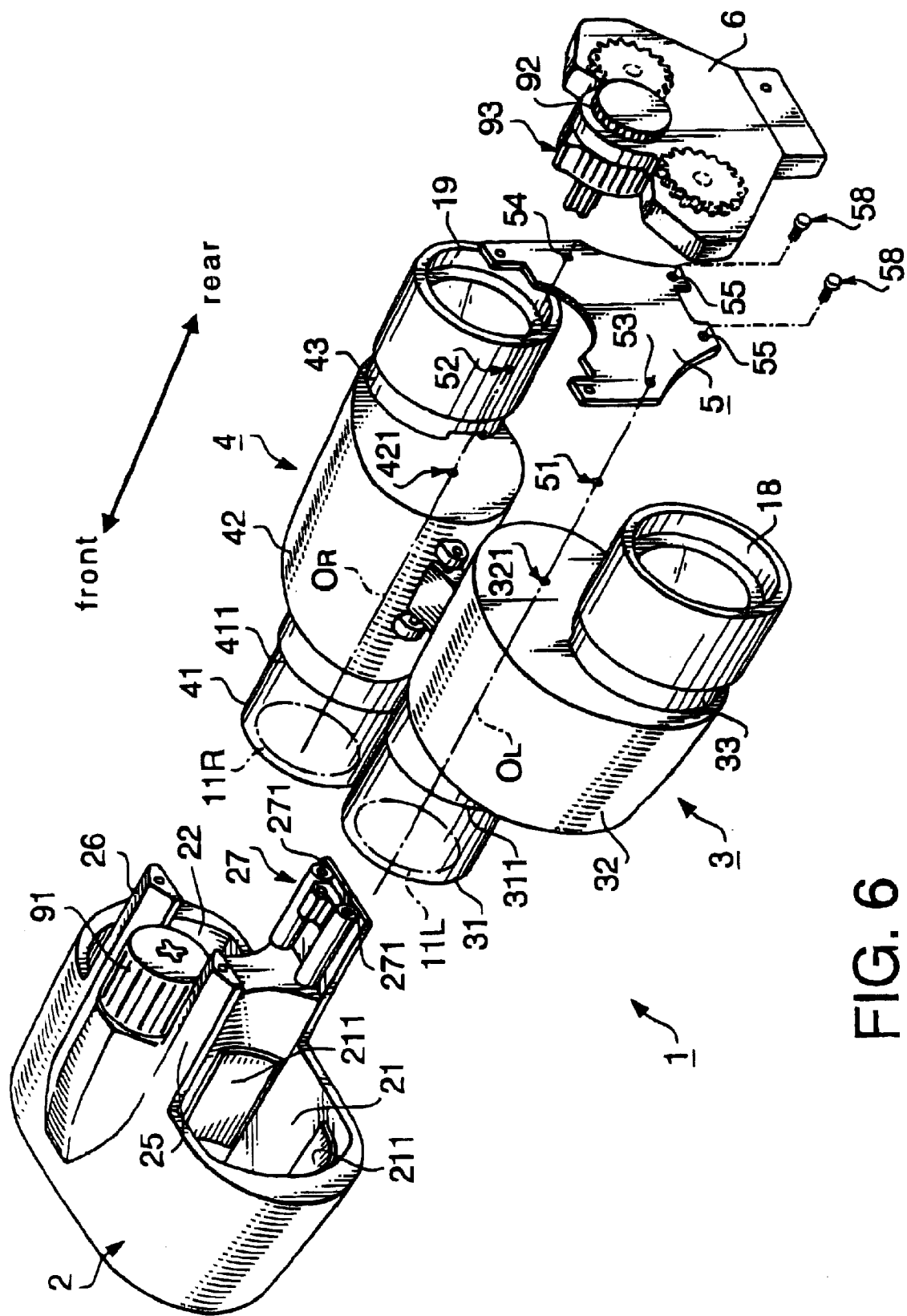
FIG. 6 is an exploded perspective view of the binocular of FIG. 4.

FIG. 6 is an exploded perspective view of the binocular 1. The binocular 1 includes left and right rotatable bodies 3 and 4 respectively accommodating the left and right telescope systems 10L and 10R (FIG. 5). The left rotatable body 3 includes a front barrel 31 and a rear barrel 33 which are parallel but off-centered with each other. An intermediate barrel 32 is provided between the front and rear barrels 31 and 33. The first lens 11L (FIG. 5) is accommodated in the front barrel 31. The second lens 12L and the prisms 13L and 14L (FIG. 5) are accommodated in the intermediate barrel 32. The third and fourth lenses 15L and 16L (FIG. 5) are accommodated in the rear barrel 33. the rear end of the rear barrel 33 constitutes a left eyepiece portion 18.

Similarly, the right rotatable body 4 includes a front barrel 41, a rear barrel 43 and an intermediate barrel 42. the first lens 11R (FIG. 5) is accommodated in the front barrel 41. The second lens 12R and the prisms 13R and 14R (FIG. 5) are accommodated in the intermediate barrel 42. The third and fourth lenses 15R and 16R (FIG. 5) are accommodated in the rear barrel 43. The rear end of the rear barrel 43 constitutes a right eyepiece portion 19.

In order to rotatably support the left and right rotatable bodies 3 and 4, the binocular 1 is further provided with a front support 2 and a rear support 5. The front support 2 is provided with two bores 21 and 22. The front barrels 31 and 41 have cylindrical shapes and are fit into the bores 21 and 22. The rear support 5 is a plate member which supports the rear ends of the intermediate barrels 32 and 42 via balls 51 and 52 (respectively positioned on the object optical axes OL and OR) The rear support 5 has holes 53 and 54 positioned on the object optical axes OL and OR. Further, recesses 321 and 421 are formed on the rear ends of the intermediate barrels 32 and 42 and on the object optical axes OL and OR. The balls 51 and 52 are supported (on the object optical axes OL and OR) by the holes 53 and 54 and by the recesses 321 and 421. An extending portion 27 is extended rearward from the bottom of the front support 2. The extending portion 27 is provided with two screw holes 271 at the rear end thereof The rear support 5 is provided with two through-holes 55 positioned corresponding to the screw holes 271. By inserting two screws 58 through the through-holes 55 of the rear support 5 and by engaging the screws 58 into screw holes 271 of the extending portion 27, the left and right rotatable bodies 3 and 4 are sandwiched by the front and rear supports 5 and 6 and supported in such a manner that the rotatable bodies 3 and 4 are respectively rotatable about the object optical axes OL and OR.

The rotatable bodies 3 and 4 have shoulder portions 311 and 411 which abuts abutting portions 211 and 221 formed in the bore 21 and 22 (the right abutting portion 221 is not shown). Since the rotatable bodies 3 and 4 are urged by the rear support 5 against the front support 2, the positions (in the direction parallel to the object optical axes OL and OR) of the rotatable bodies 3 and 4 are determined.

The binocular 1 is so constituted that the focus adjustment is performed by moving the left and right first lenses 11L and 11R along the object optical axes OL and OR, while the diopter correction is performed by moving the right first lens 11R along the object optical axis OR. Further, the binocular is so constituted that the magnifying power is varied by moving the second lenses 12L and 12R and the third lens 15L and 15R in the direction parallel to the object optical axes OL and OR. A focus adjusting knob 91 is disposed at the top center of the front support 2, which is to be operated for focus adjustment. A rear cover 6 is provided to the rear support 5, on which a diopter correction knob 92 and a magnifying-power-varying knob 93 are disposed. The description of the arrangement for the focus adjustment, the diopter correction, and the magnifying-power-varying is omitted.

Figure 7:
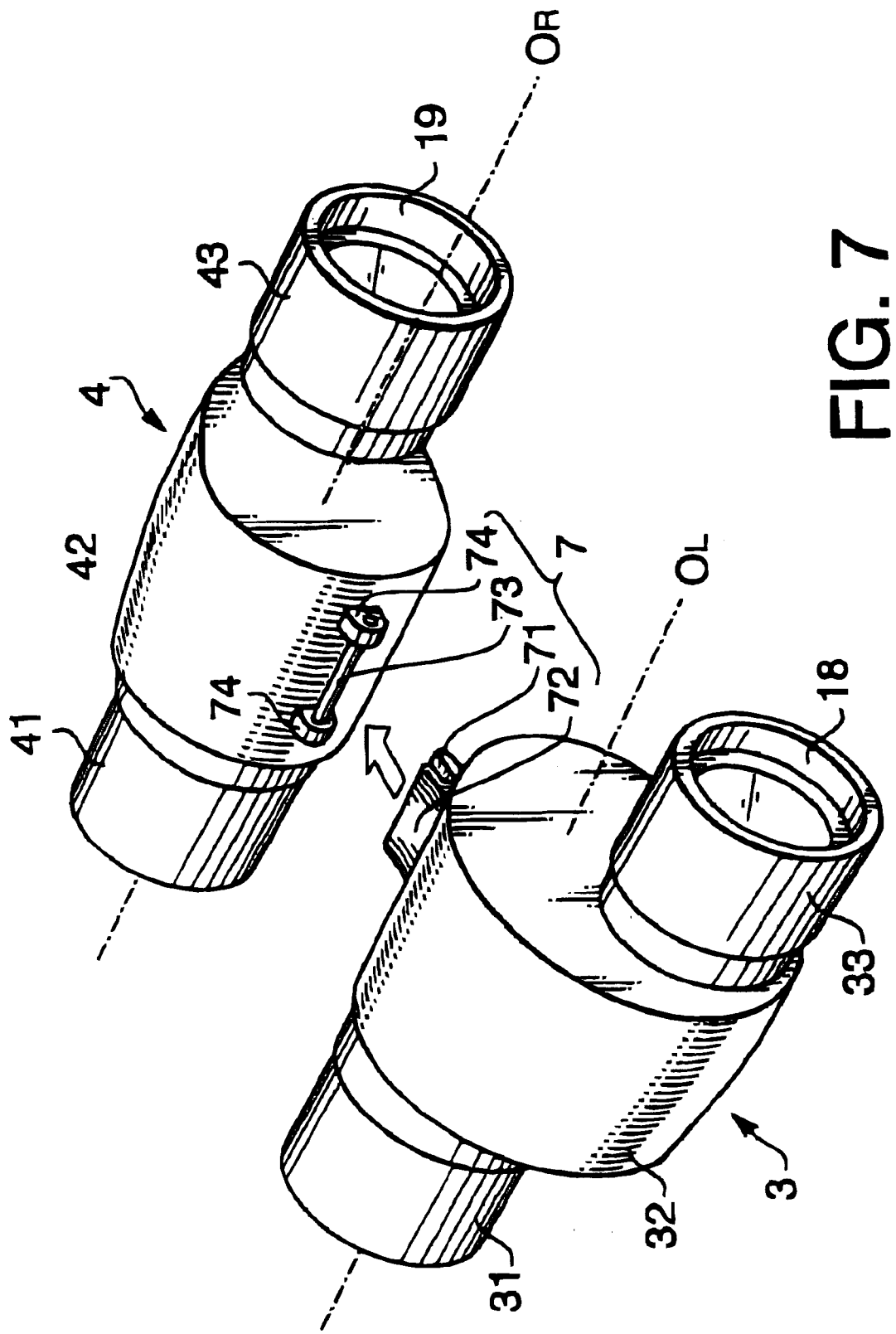
FIG. 7 is a perspective view illustrating left and right barrel of the binocular of FIG. 4.

FIG. 7 is a perspective view of the left and right rotatable bodies 3 and 4. A synchronizing mechanism 7 is provided on the facing curved surfaces of the left and right intermediate barrels 32 and 42, for synchronizing the rotations of the left and right rotatable bodies 3 and The synchronizing mechanism 7 includes a protruding member 72 provided on the outer surface of the left intermediate barrel 32 and a pin 73 provided to the right intermediate barrel 42. The pin 73 extends in parallel to the object optical axes OL and OR, both distal ends being supported by a pair of pin-holders 74 planted an the surface of the right intermediate barrel 42. The protruding member 72 has a certain width in a direction of the object optical axes OL and OR and has groove 71 which the pin 73 engages. An end of the groove 71 is opened so that the pin 73 can be easily inserted into the groove 73, while the other end of the groove 71 is closed.

Figure 8:
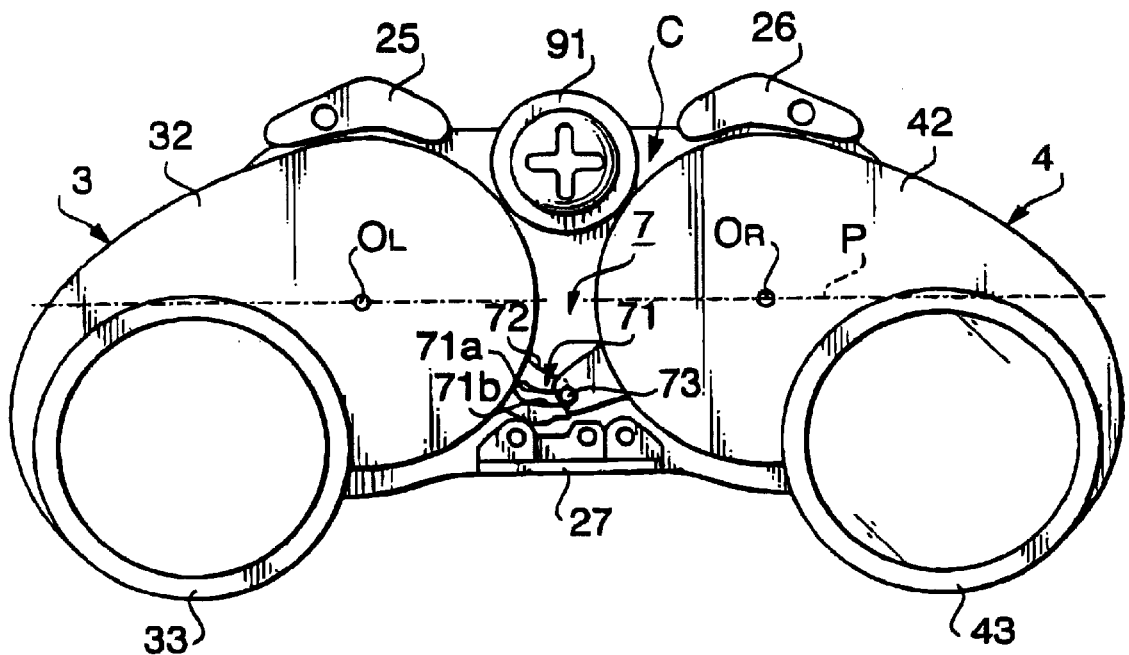
FIG. 8 is a rear view of the binocular of FIG. 4 showing a state the interpupillary distance is minimum.
Figure 9:
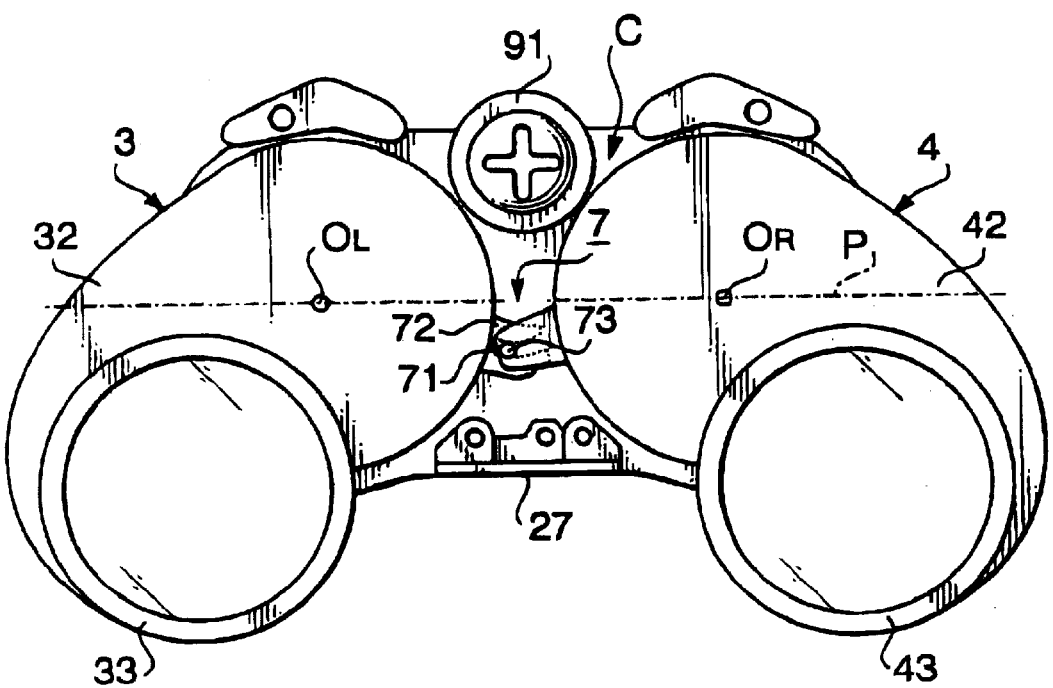
FIG. 9 is a rear view of the binocular of FIG. 4 showing a state the interpupillary distance is medium.
Figure 10:
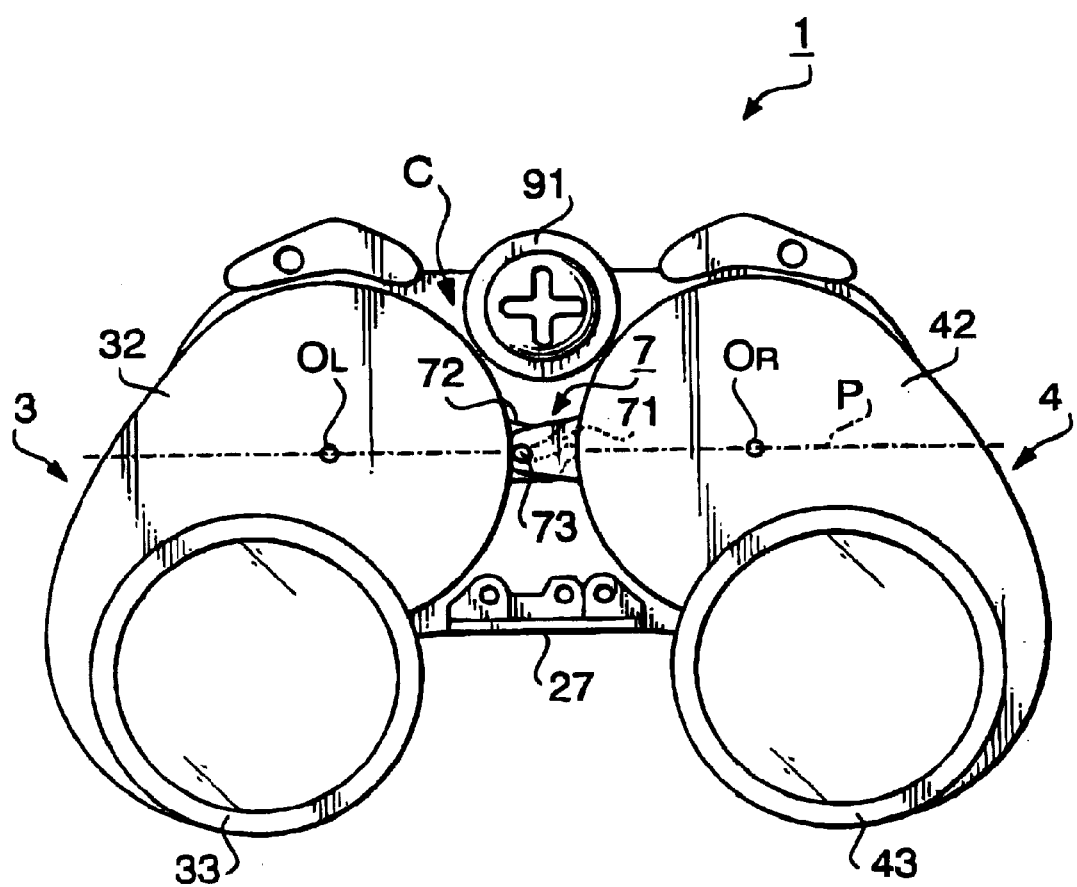
FIG. 10 is a rear view of the binocular of FIG. 4 showing a state the interpupillary distance is maximum.

FIGS. 8, 9 and 10 are rear views of the binocular 1, respectively showing the states where the interpupillary distance is maximum, medium and minimum. In the FIGS. 8 through 10, the rear support 5 and the rear cover 6 are omitted. As shown in FIGS. 8 through 10, the pin 73 engages the groove 71 so that the pin 73 is slidable along the sliding surfaces 71a and 71b (FIG. 8) of the groove 71. Accordingly, when an observer rotates the right rotatable body 4, the pin 73 urges the groove 71 so as to rotate the left rotatable body 3. When the observer rotates the left rotatable body 3, the groove 71 urges the pin 73 so as to rotate the right rotatable body 3. Thus, the left and right rotatable bodies 3 and 4 are synchronously rotate, due to the engagement of the pin 73 and the groove 71.

The protruding member 72 abuts the extending portion 27 in FIG. 8, so that the protruding member 72 and the extending portion 27 act as a stopper when the interpupillary distance is maximum. The pin 73 abuts the closed end of the groove 71 as shown in FIG. 10, so that the pin 73 and the groove 71 act as a stopper when the interpupillary distance is minimum.

In FIGS. 8 through 10, an imaginary plane P is defined so that the plane P includes both object optical axes OL and OR. Since the groove 71 has a certain length at least in a direction toward and away from the left intermediate barrel 32, the operating area of the pin 73 and the protruding member 72 can be disposed beneath the plane P. When the interpupillary distance is maximum (FIG. 8) or medium (FIG. 9), the pin 73 and the protruding member 72 are positioned beneath the plane P. When the interpupillary distance is minimum (FIG. 10), the pin 73 and the protruding member 72 are almost positioned on the plane P. Thus, the pin 73 and protruding member 72 do not enter a space C between curved surfaces of the intermediate barrels 32 and 42 and above the plane P. With such an arrangement, it is possible to effectively utilize the space C to dispose a focus adjusting knob 91 in the space C as shown in FIG. 10. Thus, it is possible to make the binocular 1 compact in size.

Figure 11:
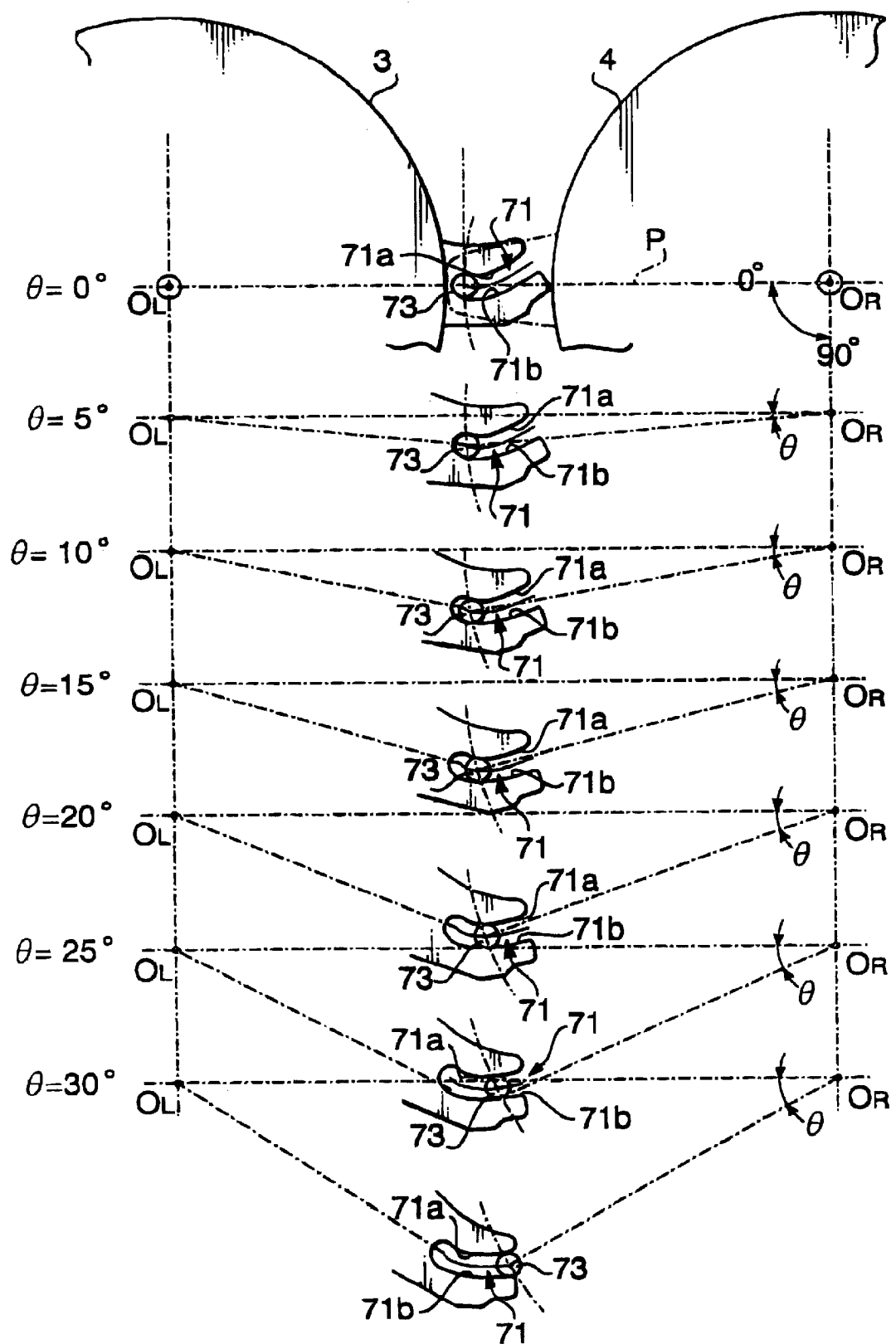
FIG. 11 is a schematic view illustrating the engagement of engaging members.

The engagement of the pin 73 and the groove 71 is detailed with reference to FIG. 11. In FIG. 11, $\theta$ represents an angle between a line connecting the center of the pin 73 and the right object optical OR and the plane P (which appears as a lateral line in FIG. 11). That is, $\theta$ represents the rotation angle of the right rotatable body 4. The angle $\theta$ is zero when the interpupillary distance is maximum, while the angle $\theta$ is 30 degree when the interpupillary distance is minimum.

In this embodiment, the groove 71 has a curve such that, where the pin 73 contacts the groove 71, the sliding surfaces 71a and 71b thereof are almost perpendicular to the rotating direction of the pin 73. With this, when the observer rotates one of the rotatable bodies 3 and 4, the applied force is effectively transmitted to the other of the rotatable bodies 3 and 4. That is, when the observer rotates the right rotatable body 4, the pin 73 effectively urges the groove 71. Similarly, when the observer rotates the left rotatable body 3, the groove 71 effectively urges the pin 73. With this, the observer can smoothly perform the interpupillary adjustment. Further, since the rotational angles of the left and right rotatable bodies 3 and 4 are the same, the interpupillary adjustment becomes more symmetrical.

Figure 12:
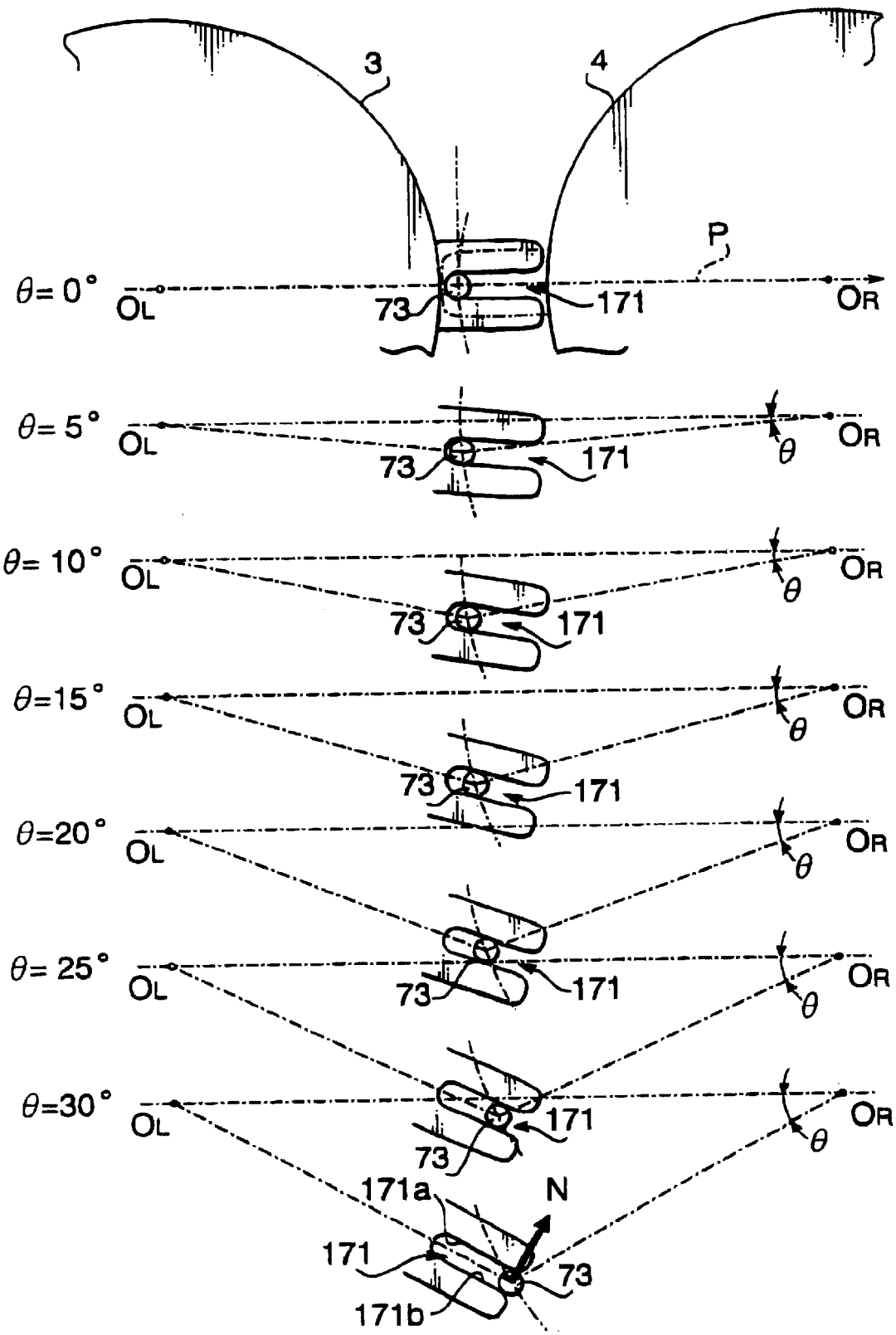
FIG. 12 is a schematic view illustrating a modification of the engagement of engaging members.

For comparison, FIG. 12 shows an example in which a straight groove 171 is employed instead of the curved groove 71 of FIG. 11. As shown in FIG. 12, when the angle $\theta$ is 30 degree, sliding surfaces 171a and 171b of the groove 171 are not perpendicular to the rotating direction of the pin 73. Thus, when the observer rotates the left rotatable body 3 in a state that the angle $\theta$ is 30 degree, the groove 71 does not effectively urges the pin 73 since the direction of the applied force N is different from the rotating direction of the pin 73. It prevents the smooth operation of the interpupillary adjustment. Further, the rotational angles of the left and right rotatable bodies 3 and 4 are not the same.

Although the structure and operation of a binocular is described herein with respect to the preferred embodiments, many modifications and changes can be made without departing from the spirit and scope of the invention.

The present disclosure relates to subject matter contained in Japanese Patent Application No- HI 09-29616 filed on Jan. 29, 1997, which is expressly incorporated herein by reference in its entirety.

What is claimed is:

1. A binocular comprising:
   two parallel telescope systems, each telescope system having an object system and an eyepiece system, and an eyepiece optical axis of said eyepiece system being parallel but not coaxial with an object optical axis of a front-most lens of said object system;
   first and second rotatable bodies respectively accommodating said telescope systems, said rotatable bodies being rotatable about two parallel rotation axes for interpupillary adjustment, said rotation axes being aligned with said object optical axes;
   a sliding surface provided to said first rotatable body, said sliding surface comprising inner surfaces of a groove formed on a protruding body provided to said first rotatable body; and
   a contact member provided to said second rotatable body, said contact member being in contact with said sliding surface in such a manner that said contact member is slidable with respect to said sliding surface by a certain amount, said contact member comprising a pin provided to said second rotatable body, which engages said groove,
   wherein, when one of said rotatable bodies is rotated, the other is also rotated due to the contact of said contact member and said sliding surface, and
   wherein said groove is curved such that, where said pin contacts said groove, said inner surfaces are perpendicular to the rotating direction of said pin.

2. The binocular according to claim 1, wherein said groove has a width in a direction in parallel with said rotation axes of said rotatable bodies, and wherein said pin extends in a direction of said rotation axes.

3. The binocular according to claim 1, wherein said pin is movable substantially at one side of a plane including both rotating axes of said rotatable bodies.

4. The binocular according to claim 3, wherein, when pin is on said plane, the interpupillary distance is minimum.

5. The binocular according to claim 1, wherein said groove has two ends, one end being opened and the other being closed.

6. The binocular according to claim 5, wherein, when the interpupillary distance is minimum, said pin abuts a closed end of said groove.

7. The binocular according to claim 1, further comprising a stopper to which said protruding body abuts when the interpupillary distance is maximum.

8. A binocular comprising:
   two parallel telescope systems, each telescope system having an object system and an eyepiece system, and an eyepiece optical axis of said eyepiece system being parallel but not coaxial with an object optical axis of a front-most lens of said object system;
   first and second rotatable bodies respectively accommodating said telescope systems, said rotatable bodies being rotatable about two parallel rotation axes for interpupillary adjustment, said rotation axes being aligned with said object optical axes;
   a groove provided to said first rotatable body;
   a pin provided to said second rotatable body, said pin engaging with said groove so that said pin is slidable with respect to said groove;
   wherein, when one of said rotatable bodies is rotated, the other is also rotated due to the contact of said pin and said groove, and
   wherein said groove has a curved surface such that, where said pin contacts said surface, said surface is perpendicular to the rotating direction of said pin.

9. The binocular according to claim 8, wherein said groove has a width in a direction of said rotation axes of said rotatable bodies, and wherein said pin extends in a direction of said rotation axes.

10. The binocular according to claim 9, wherein said groove has a length at least in a direction toward and away from the rotation axis of said first rotatable body.

11. The binocular according to claim 8, wherein said pin is movable substantially at the lower side with respect to a plane including both rotating axes of said rotatable bodies.

12. A binocular, comprising:

two parallel telescope systems; first and second rotatable bodies respectively accommodating said telescope systems, said rotatable bodies being rotatable about two parallel rotation axes for interpupillary adjustment; and a synchronizing mechanism provided to synchronize the rotation of said rotatable bodies, said synchronizing mechanism being operated substantially at one side of a plane including both rotation axes;

wherein said synchronizing mechanism comprises a groove provided to said first rotatable body and a pin provided to said second rotatable body, said pin engaging with said groove;

wherein said groove has a curved surface such that, where said pin contacts said surface, said surface is perpendicular to the rotating direction of said pin.

13. The binocular according to claim 12, wherein said groove has a length at least in a direction toward and away from the rotation axis of said first rotatable body.

* * * * *